Jan. 21, 1947. J. SANDUSKY Re 22,833

ELECTROLYTE LEVEL CONTROL DEVICE FOR STORAGE BATTERIES

Original Filed Dec. 27, 1941

Inventor
J. Sandusky
By Gareth E. Wayne
Atty.

Reissued Jan. 21, 1947

Re. 22,833

UNITED STATES PATENT OFFICE 22,833

ELECTROLYTE LEVEL CONTROL DEVICE FOR STORAGE BATTERIES

Julius Sandusky, Toronto Township, Peel County, Ontario, Canada

Original No. 2,306,569, dated December 29, 1942, Serial No. 424,661, December 27, 1941. Application for reissue December 21, 1944, Serial No. 569,155

6 Claims. (Cl. 136—177)

This invention relates to electrolyte level control devices for storage batteries, and particularly to the type of device in which the filling up of the filling opening indicates when the battery is filled to the proper level.

In such devices it is necessary to provide an opening sufficiently large to accommodate the tubes used for inserting the electrolyte when the battery is assembled. It is also necessary to provide an opening for insertion of the hydrometer for testing the electrolyte. Furthermore it is desirable to so construct the device that the electrolyte will stay up in the filling opening long enough to give a definite indication that the battery is filled to the required level.

The object of this invention is to devise an improved device which will satisfy the above requirements and which may be manufactured by mass production methods at a cost of very little more than batteries not provided with such a device.

Figure 1:
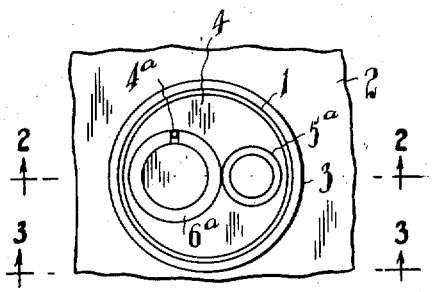
Figure 2:
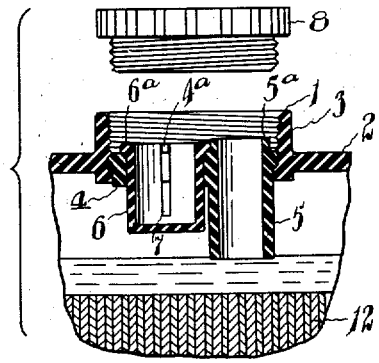
Figure 4:
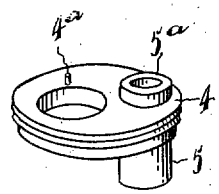
Figure 5:
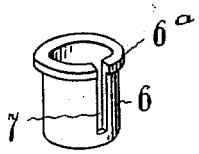
Figure 3:
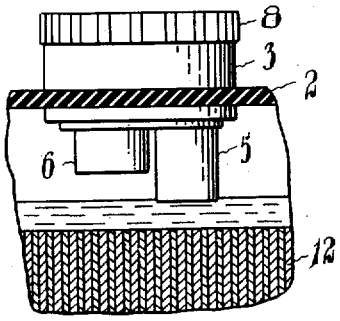

This object is attained by means of the construction hereinafter described and illustrated by way of example in the accompanying drawing in which Figure 1 is a fragmentary plan view of a battery, with the cap removed, showing the filling opening made in accordance with my invention;

Figure 2 a fragmentary vertical section through the filling opening on the line 2—2 in Figure 1 showing the cap above the opening;

Figure 3 is a fragmentary vertical section on the line 3—3 in Figure 1, with the cap in position;

Figure 4 a perspective view of the plug in the filling opening with the cup removed; and Figure 5 a perspective view of the cup.

In the drawing like numerals of reference indicate corresponding parts in the different figures.

The construction of the battery is well known and therefore only such parts thereof as are relative to the present invention are indicated. A filling opening 1 is formed in the top of the battery casing 2. An outwardly extending boss 3 surrounds the filling opening, said boss being threaded to receive a cap 8 which may be of any suitable construction, and which is shown in Figure 2 above the filling opening and in Figure 3 mounted on the filling opening and screwed into the boss 3.

The interior of the boss 3 is threaded, not only to receive the cap 8, but to receive a plug 4, which may be screwed down to a point adjacent the inner or lower end of the filling opening and forms a shoulder or baffle therein. The plug 4 is provided with two holes therein, one of said holes having a depending open ended vent tube 5 which extends therefrom into the interior of the cell, and the upper end of which extends slightly above the upper surface of the plug 4 and forms a rim 5a.

Mounted in the other hole in the plug 4, which is preferably circular and slightly larger than the diameter of the hole from which the tube 5 depends, is a cylindrical filling well or cup 6, closed at the bottom and open at the top with an outwardly extending rim 6a adapted to rest on the plug 4. Extending from the upper edge of the cup 6 to a point adjacent the bottom thereof is a slot 7, preferably about $\frac{3}{32}$'' wide. Suitable means for preventing the cup from turning and retaining the slot in a desired position is provided, such means being indicated in the drawing as a teat or lug 4a over which the upper end of the slot 7 extends. It is found that if the slot 7 is located too close to the tube 5 liquid will flow more rapidly through the slot than if it is located an appreciable distance away from the tube 5 as shown in the drawing. The interior of the boss 3 and the cup 6 form a filling passage.

The tube 5 is of sufficient internal diameter to permit the insertion of the tube of a hydrometer for testing the specific gravity of the electrolyte, and for insertion of a venting tube when the battery is being filled with electrolyte in the course of assembly thereof. The hole in plug 4 in which the cup 6 is inserted is sufficiently large to allow the insertion of the filling tube of the filling apparatus used in manufacturing the battery. For this purpose the cup 6 is removable and is not inserted until the initial filling of the battery. After the battery has been filled initially to the proper level, the cup is inserted.

The operation of the device is as follows: The operator is instructed to pour water with which the battery is being filled into the cup 6. The water tends to form a seal over the slot 7. However, the water will flow through the slot 7 into the interior of the cell until the electrolyte in the cell rises to the bottom of the tube 5, thus closing the tube and forming a slight air pressure in the closed space within the top of the cell. This pressure resists the flow of water through the slot 7 and causes a seal to form over the slot and prevents further flow therethrough, causing the water to rise in the filling passage which is an indication to the operator that the battery is filled to the proper level. When the operator discontinues pouring water into the cup 6 the water will gradually flow out through the slot 7 sufficiently to permit air to escape through said slot, whereupon the water in the filling passage will flow down into the cell.

The rim 5a on the tube 5 prevents the water that has risen over the baffle from flowing down to tube 5 creating a "lake" of water over the joint between the upper edge of the cup 6 and the plug 4 and also over the upper end of the slot 7, sealing the joint and the upper end of the slot. If pouring is continued after the cup is full, the water will rise over the rim 5a and run down through the tube 5 until the tube 5 is filled, when the water will rise in the filling passage to the top thereof and will overflow if further water is poured in, but the level in the battery will not rise above the level of the bottom of the tube 5.

Apart from the advantage of having a removable cup for initial filling of the battery, the construction of the cup with the closed bottom has the advantage that a seal will form over the slot sufficiently to practically prevent water from flowing therethrough, and at any rate to prevent air from escaping from the top of the interior of the cell when the level of the electrolyte in the cell reaches the bottom of the vent tube 5, even if a comparatively wide slot is formed. It is advantageous in the manufacture of the device to have a wide slot, since it is difficult to mould a slot in hard rubber or similar material, if the slot is much narrower than $^3/_{32}''$. Moreover, by this construction, although a seal is quickly formed when the electrolyte reaches the bottom of the vent tube 5, as soon as the operator discontinues pouring, the seal will break comparatively rapidly, thus permitting a quick drop of the liquid in the filling passageway.

Although the invention has been described in some detail, it will be understood that the invention is not limited in its scope except as defined in the annexed claims.

What I claim as my invention is:

1. In an electrolyte level control device for storage batteries, a cell having a filling passage therein; a baffle in the passage below the top thereof; two openings in the baffle communicating with the interior of the cell; an open-ended tube extending from one of the openings into the cell to the point to which it is desired that the battery should be filled; and a cup extending into the interior of the cell from the other opening in the baffle, said cup having an aperture in the wall thereof of such width that a seal forms thereover when liquid is poured into the cup and the electrolyte in the cell rises to the bottom of the open-ended tube.

2. In an electrolyte level control device for storage batteries, a cell having a filling passage therein; a baffle in the passage below the top thereof; two openings in the baffle communicating with the interior of the cell; an open-ended tube extending from one of the openings into the cell to the point to which it is desired that the battery should be filled; and a removable cup extending into the interior of the cell from the other opening in the baffle, said cup having an aperture in the wall thereof of such width that a seal forms thereover when liquid is poured into the cup and the electrolyte in the cell rises to the bottom of the open-ended tube.

3. In an electrolyte level control device for storage batteries, a cell having a filling passage therein; a baffle in the passage below the top thereof; two openings in the baffle communicating with the interior of the cell; an open-ended tube extending from one of the openings into the cell to the point to which it is desired that the battery should be filled; a removable cup extending into the interior of the cell from the other opening in the baffle, said cup having an aperture in the wall thereof of such width that a seal forms thereover when liquid is poured into the cup and the electrolyte in the cell rises to the bottom of the open-ended tube; and means for preventing turning of the cup in the opening.

4. In an electrolyte level control device for storage batteries, a cell having a filling passage therein; a baffle in the passage below the top thereof; two openings in the baffle communicating with the interior of the cell; an open-ended tube extending from one of the openings into the cell to the point to which it is desired that the battery should be filled; and a cup extending into the interior of the cell from the other opening in the baffle, said cup having a slot approximately $^3/_{32}''$ wide in the side thereof extending from the top thereof to adjacent the bottom thereof.

5. In an electrolyte level control device for storage batteries, a cell having a filling passage therein; a baffle screwed into the passage below the top thereof; two openings in the baffle communicating with the interior of the cell; an open-ended tube extending from one of the openings into the cell to the point to which it is desired that the battery should be filled; and a cup extending into the interior of the cell from the other opening in the baffle, said cup having an aperture in the wall thereof of such width that a seal forms thereover when liquid is poured into the cup and the electrolyte in the cell rises to the bottom of the open-ended tube.

6. In an electrolyte level control device for storage batteries, a cell having a filling passage therein; a baffle in the passage below the top thereof; two openings in the baffle communicating with the interior of the cell; an open-ended tube extending from one of the openings into the cell to the point to which it is desired that the battery should be filled; a rim around the opening from which said tube extends; and a cup extending into the interior of the cell from the other opening in the baffle, said cup having an aperture in the wall thereof of such width that a seal forms thereover when liquid is poured into the cup and the electrolyte in the cell rises to the bottom of the open-ended tube.

JULIUS SANDUSKY.